United States Patent
Ikunami

(10) Patent No.: US 7,639,477 B2
(45) Date of Patent: Dec. 29, 2009

(54) DISPLAY DEVICE

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 285 days.

(21) Appl. No.: 11/885,517

(22) PCT Filed: May 16, 2006

(86) PCT No.: PCT/JP2006/009737

§ 371 (c)(1),
(2), (4) Date: Aug. 31, 2007

(87) PCT Pub. No.: WO2006/126424

PCT Pub. Date: Nov. 30, 2006

(65) Prior Publication Data

US 2008/0170358 A1 Jul. 17, 2008

(30) Foreign Application Priority Data

May 26, 2005 (JP) ............................. 2005-154327
Aug. 16, 2005 (JP) ............................. 2005-235956

(51) Int. Cl.
 *G06F 1/16* (2006.01)
(52) U.S. Cl. ................................. 361/679.01
(58) Field of Classification Search ............ 361/679.01
 See application file for complete search history.

(56) References Cited

U.S. PATENT DOCUMENTS

| | | | | |
|---|---|---|---|---|
| 5,467,106 A | * | 11/1995 | Salomon | ............. 345/87 |
| 5,847,685 A | * | 12/1998 | Otsuki | ............. 345/87 |
| 6,011,685 A | * | 1/2000 | Otsuki | ............. 361/679.01 |
| 6,499,788 B2 | * | 12/2002 | Ito et al. | ............. 296/70 |
| 6,529,123 B1 | * | 3/2003 | Paul, Jr. | ............. 340/425.5 |
| 7,090,186 B2 | * | 8/2006 | Quinno et al. | ............. 248/324 |
| 7,280,282 B2 | * | 10/2007 | Kageyama et al. | ............. 359/632 |
| 7,304,836 B2 | * | 12/2007 | Nakamura et al. | ............. 361/679.27 |
| 7,337,450 B2 | * | 2/2008 | Sato et al. | ............. 720/647 |
| 2002/0021279 A1 | | 2/2002 | Nakasuna | |
| 2002/0101117 A1 | * | 8/2002 | Shibuya | ............. 307/9.1 |
| 2003/0169158 A1 | | 9/2003 | Paul, Jr. | |
| 2004/0075639 A1 | * | 4/2004 | Lester et al. | ............. 345/156 |
| 2005/0031317 A1 | * | 2/2005 | Ikunami | ............. 386/125 |
| 2005/0111176 A1 | * | 5/2005 | Sorensen et al. | ............. 361/682 |
| 2006/0232527 A1 | * | 10/2006 | Oh | ............. 345/87 |

FOREIGN PATENT DOCUMENTS

| | | |
|---|---|---|
| DE | 10 2004 036 458 A1 | 3/2005 |
| DE | 10 2004 008 791 B3 | 9/2005 |
| EP | 0 406 519 A1 | 1/1991 |
| JP | 3-54041 A | 3/1991 |
| JP | 4-339042 A | 11/1992 |
| JP | 6-55980 A | 3/1994 |
| JP | 11-310087 A | 11/1999 |

(Continued)

*Primary Examiner*—Lisa Lea-Edmonds
(74) *Attorney, Agent, or Firm*—Birch, Stewart, Kolasch & Birch, LLP

(57) ABSTRACT

A rotating shaft supporting means 3 is provided with a rotating shaft shifting means 18 for shifting a rotating shaft 2 by a predetermined distance in a predetermined direction when a display means 1 is rotated on the rotating shaft 2 to a predetermined angle. Further, the rotating shaft of the display means is electrically driven.

10 Claims, 14 Drawing Sheets

FOREIGN PATENT DOCUMENTS

| | | |
|---|---|---|
| JP | 11-342798 A | 12/1999 |
| JP | 2001-222232 A | 8/2001 |
| JP | 2001-311902 A | 11/2001 |
| JP | 2002-23652 A | 1/2002 |
| JP | 2002-193045 A | 7/2002 |
| JP | 2004-182049 A | 7/2004 |
| JP | 2005-96624 A | 4/2005 |
| JP | 2005-329760 A | 12/2005 |

* cited by examiner (Front of Vehicle)

Front ⬅——  ——➡ Rear (Front of Vehicle)
Front ←

(Front of Vehicle)
Front ←

DISPLAY DEVICE

TECHNICAL FIELD

The present invention relates to a display device, which is mounted, e.g., on a ceiling of a motor vehicle, and allows opening and closing operations in which the display device opens in use and close in housing.

BACKGROUND ART

It is generally known to the general public of a structure in which a video display serving as a display means is openably and closably attached to a ceiling of the inside of a vehicle (e.g., see Patent Document 1). In such a conventional technology, the rectangular display has a supporting structure in which the display is connected to housing through a hinge and is rotatable on a fixed fulcrum. To be more precious, the structure is arranged such that, in housing, it becomes a closed state in which a display screen is housed along the ceiling, and, in use, it becomes a so-called opened state in which the display is displaced up to a state where the screen gets to nearly perpendicular for easy viewing of the display by a viewer. In this opened state, the display occupies downward a space corresponding virtually to longitudinal dimensions of the display from the fixed fulcrum.

In recent years, there is a tendency for displays to increase in size. With the increase in the longitudinal dimensions of the display, the enlarged display attends evils of obstructing the rear field of view of a room mirror for a driver, and is at issue from a safety standpoint. Since sporty-type vehicles and vehicles with sunroof are being designed to have a lower ceiling than that of general vehicles, a small-sized display had to be provided not to obstruct the rear field of view by the display.

It is better known of another structure in which a video display acting as a display means is openably and closably mounted on a ceiling of the inside of a vehicle, a linear-traveling plate driven by a motor and the display means are coupled by a lifting arm, and linear motion of the linear-traveling plate is converted into rotational motion of the display means through the lifting arm (see e.g. Patent Document 2).

In such a conventional technology, the lifting arm itself is not only an eyesore judging from a design viewpoint, but also partially obstructs the display when obliquely viewing the display, obstructing the rear field of view of the room mirror for a driver according to a mounting position thereof and disposition of a driver's sheet, which could become an issue from a safety viewpoint. Further, there can be a danger that a finger inadvertently gets caught by the lifting arm because an opening of the display is changed during operation of the lifting arm.

Patent Document 1: JP-A2002-193045
Patent Document 2: JP-A2004-182049

As the conventional display means supporting structure adopts the fixed fulcrum, there some fears from a safety viewpoint due to obstruction of the rear field of view of the room mirror for a driver with the aggrandizement of the display. Conversely, the size of the display is reduced to the extent that the rear field of view is not obstructed, a viewer cannot derive his/her feeling of satisfaction viewed from communication ability view point. In this way, there were problems to be solved in various situations.

The present invention has been made to solve the above-mentioned problems, and an object of the present invention is to provide an improved display device that is free from obstruction of the rear field of view of the room mirror for a driver even when a large-sized display is used.

DISCLOSURE OF THE INVENTION

The display device according to the present invention includes a rotating shaft shifting means, provided in a rotating shaft supporting means, for shifting a rotating shaft by a predetermined distance in a predetermined direction relative to the rotating shaft supporting means, when a display means is rotated to a predetermined angle on the rotating shaft. Or the display device includes a follower gear integrally formed with the rotating shaft of the display device and a driving gear driven by a motor to be geared with the follower gear.

According to the present invention, with the opening of the display means, the rotating shaft is displaced, thus enabling widening the rear field of view by a distance corresponding to the amount of the displacement. This makes it possible to use a large-sized display device while ensuring safety. In addition, the rotating shaft is driven by the motor through the gears, thus eliminating the need for a member such as a lifting arm, which could obstruct the rear field of view.

BEST MODE FOR CARRYING OUT THE INVENTION

Figure 1:
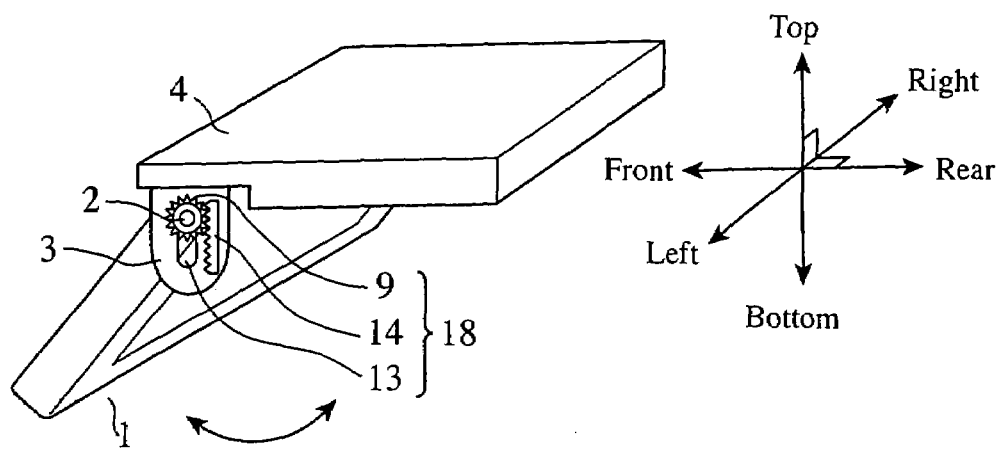
FIG. 1 is an oblique view of a display and its support mechanism.

Embodiments of the present invention will now be described with reference to the accompanying drawings in order to explain the present invention in more detail. Here, the same members and the members having the same function are designated by the same reference numerals for consistency.

First Embodiment

Referring to FIG. 1, a display 1, as an example of a display means, has a shape of a horizontally long (in a right and left direction) rectangular plate, and is rotatable with a rotating shaft 2 integrally formed with the display 1 as a fulcrum. The rotating shaft 2 is supported by a bracket 3 serving as a support means. The rotating shaft 2 concentrically projects from the right and left ends of the display 1, and the right side thereof in FIG. 1 has a supporting structure similar to that of the left side. The bracket 3 is fixed on a plate 4 constituting a ceiling of inside of a vehicle.

FIG. 1 shows an opened state of the display 1 and the display posses a position at which a screen thereof looks like to be drooping at an angle with respect to a vertical plane. In housing the display, firstly, hold the lower end of the display 1 to draw it backward, and then lift the display. Thereby, the display 1 rotates on the rotating shaft 2, the rotating shaft 2 is displaced upward by a rotating shaft shifting means 18 described later, and finally the display becomes a closed state in which the screen is substantially parallel to the plate 4.

Figure 2:
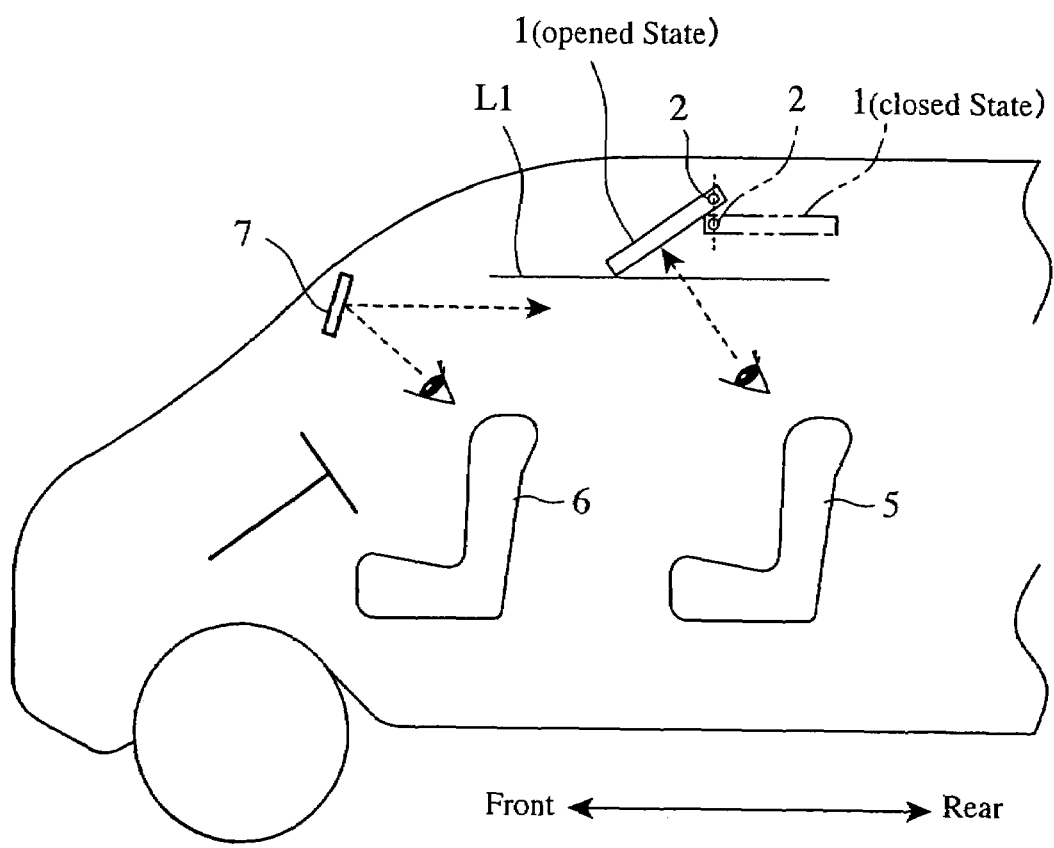
FIG. 2 is a view explaining a displaced state of the display and the rear field of view of a driver in the inside of a vehicle.

Referring to FIG. 2, the opened state of the display 1 is shown in a full line, and the closed state of the display 1 is shown in a two-dot chain line, respectively. A viewer sitting on a rear seat 5 can view the display 1 well in the opened state shown in a full line. On the one hand, when a driver sitting on a driver seat 6 located in front checks the back via a room mirror 7, a level L1 of the lower end of the display 1 is retracted to a position at which the lower end does not obstruct a driver's field of view.

Referring to FIG. 2, the rotating shaft 2 is shifted by a predetermined amount (the minimum amount which secures a position at which a driver's rear field of view is not obstructed in the first embodiment) in a predetermined direction (in a vertical direction in the first embodiment) between the opened state and closed state of the display 1. Such shift of the rotating shaft 2 is attained by the rotating shaft shifting means including a combined mechanism of a rack 14 and a pinion 9 provided in a joint of the rotating shaft 2 and the bracket 3.

Figure 3:
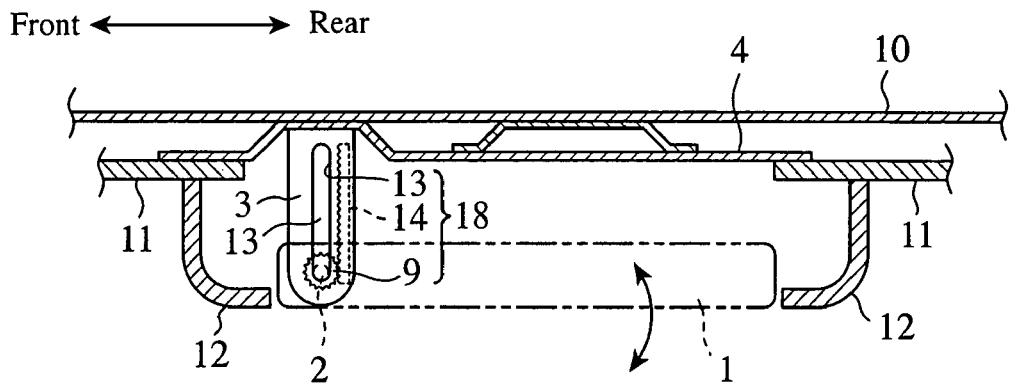
FIG. 3 is a front view of the display and its support mechanism.
Figure 4:
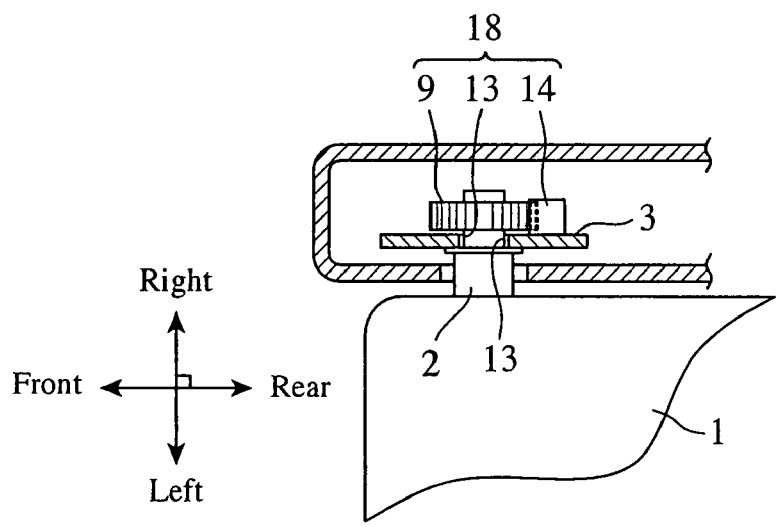
FIG. 4 is a partial sectional plan view of the display and its support mechanism.

The rotating shaft shifting means will be described by reference to FIG. 3 and FIG. 4. Referring to FIG. 3, the plate 4 is secured to a ceiling board 11 that is an interior member provided in the inside of a roof member 10 of the vehicle, and on the roof member 10. The display 1 in the closed state is housed in a design panel 12 provided on the ceiling board 11.

The pinion 9 is integrally fixed around the rotating shaft 2. A guide slot 13 in the shape of a groove oblong in a vertical direction is formed in the bracket 3. The rotating shaft 2 is engaged with the display rotatably passing through the guide slot 13 and movably along the slot. Thereby, the guide slot 13 restricts a shifting direction of the rotating shaft 3 to a vertical direction. Further, the bracket 3 is fixedly provided with the rack 14, which runs in parallel to the guide slot 13 and gears with the pinion 9.

The pinion 9, guide slot 13, and rack 14 are the main structural members constituting the rotating shaft shifting means 18, and such arrangement, when the display 1 is rotated from the closed state to the opened state, enables the rotating shaft shifting means 18 to shift the rotating shaft such that a display screen of the display means moves by a predetermined distance in an upward direction viewing from a viewer. A reverse operation of the rotating shaft shifting means allows the display to return to the closed state.

Figure 5:
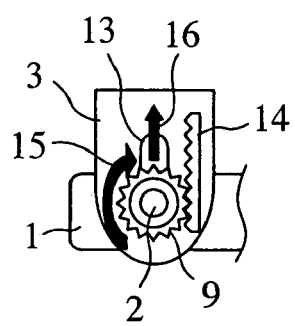
FIG. 5 is a view explaining a position at which a rack gears with a pinion in a closed state of the display.
Figure 8:
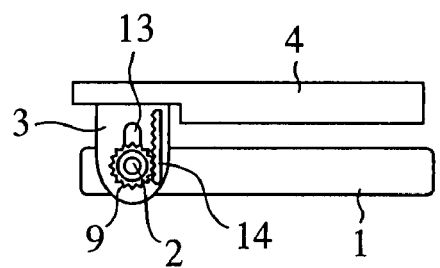
FIG. 8 is a front view showing the display in a closed state.
Figure 9:
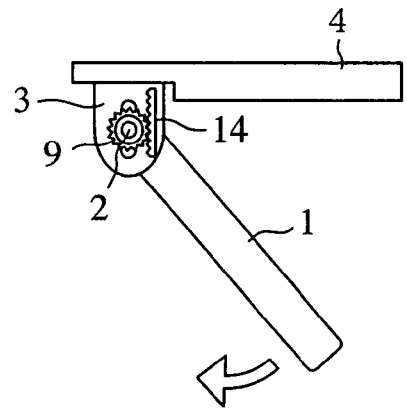
FIG. 9 is a front view showing a halfway state transitioning from a closed state to an opened state.
Figure 10:
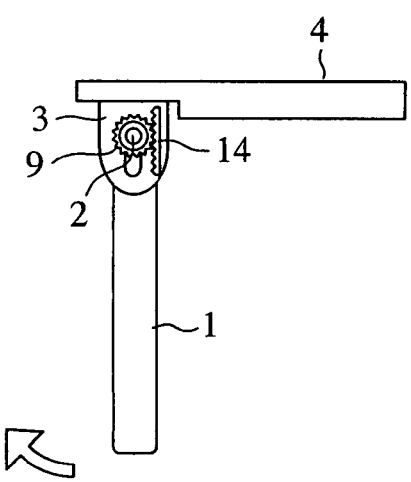
FIG. 10 is a front view showing a halfway state transitioning from a closed state to an opened state.

Herein, the operation of the display device will be mentioned. When the display 1 is in the closed state as shown in FIG. 5 and FIG. 8, rotating the display 1 in a clockwise direction as shown by an arrow 15 induces rotation of the pinion 9 together with the rotating shaft 2 in the same direction and at the same time transmits a rotating force to the rack 14. Consequently, the rotating shaft 2 shifts in an upward (vertical) direction as shown by an arrow 16 for the reason that the shifting direction of the rotating shaft 2 is restricted by the guide slot 13. The sliding operation on its way is shown in FIG. 9 and FIG. 10.

Figure 6:
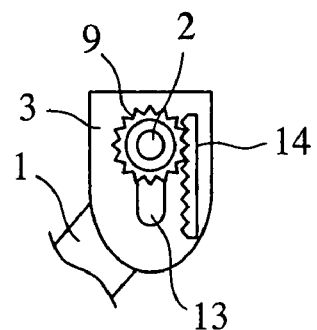
FIG. 6 is a view explaining a position at which a rack gears with a pinion in an opened state of the display.
Figure 11:
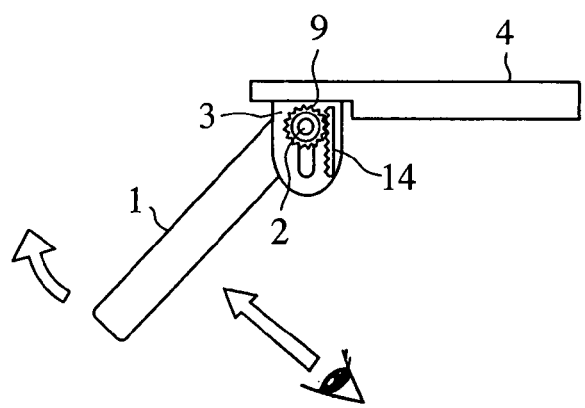
FIG. 11 is a front view showing the display in an opened state.

Finally, the display 1 is brought into an opened state shown in FIG. 6 and FIG. 11. In such a state, a position of the rotating shaft 2 is shifted more upward than is shown in FIG. 5. In the opened state of the display 1 shown in FIG. 6, rotating the display 1 in an anti-clockwise direction enables the display 1 to return to the closed state shown in FIG. 5.

Here, there is a correlation between a rotating angle of the display 1 and a shift amount of the rotating shaft 2. Thus, gear conditions are previously set such that when the display 1 is rotated to a predetermined angle, i.e., from the closed state to the opened state, the rotating shaft 2 is sifted by a predetermined distance corresponding to a position where the lower end of the display 1 does not obstruct a driver's field of view, in an upward direction that is a predetermined direction.

Figure 7:
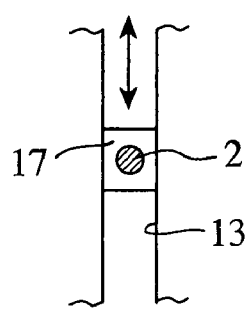
FIG. 7 is a view explaining a sliding piece member.

Say in addition, in order for an engagement of the rotating shaft 2 in the guide slot 13 to be stabilized for smoothly rotating and shifting the rotating shaft, the rotating shaft 2 may, e.g., be axially supported by a sliding piece 17 in the form of a rectangular block as shown in FIG. 7, and then, the sliding piece 17 may be slidably fitted in the guide slot 13.

Figure 12:
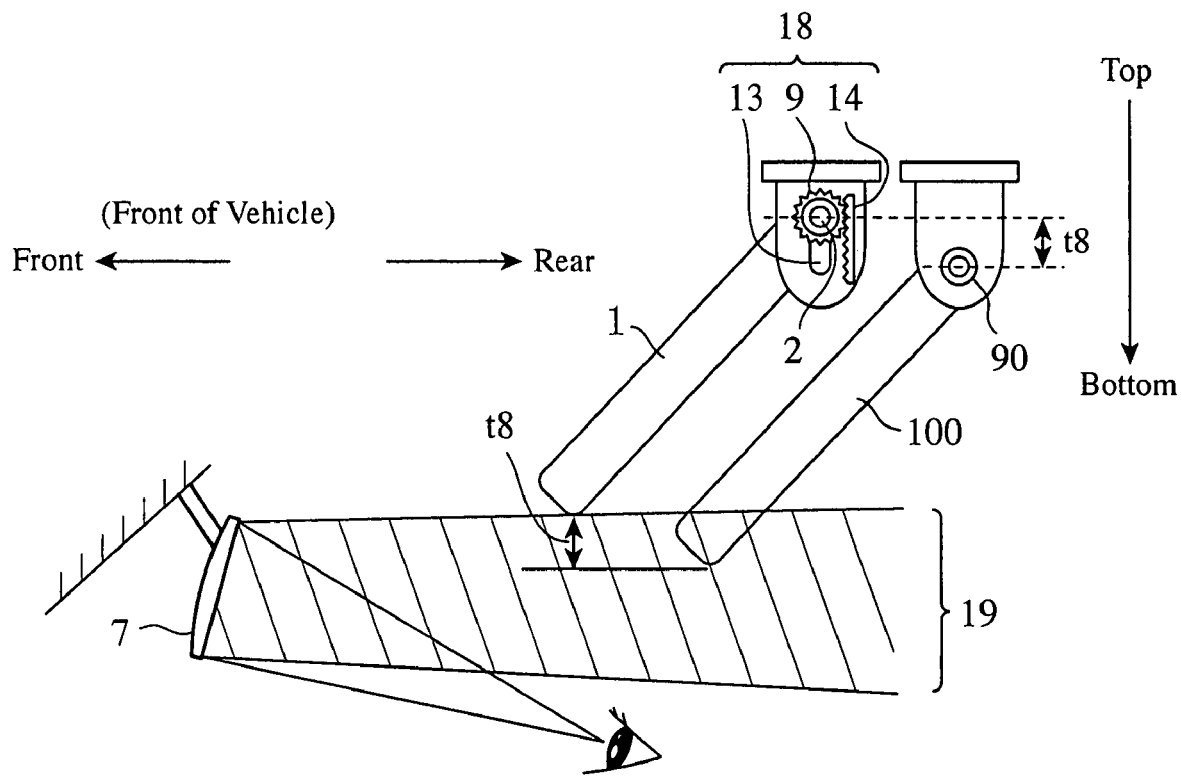
FIG. 12 is a view showing an influence upon the rear field of view in comparison with the conventional technology.

The alleviation of an influence upon the rear field of view of the room mirror by the rotating shaft shifting means 18 in the first embodiment will be described by reference to FIG. 12.

The display 1 is provided with the rotating shaft shifting means 18 including the pinion 9, guide slot 13, and rack 14 as described hereinabove. A display 100 is a former one, and the rotating shaft 90 of the display 100 is supported by the fixed fulcrum. When these displays 1, 100 are in the opened state, the distance (i.e., the distance between the lower ends of the displays 1 and 100) between the rotating shaft 2 and the rotating shaft 90 in a vertical direction is t8.

While the conventional display 100 comes in the rear field of view 19 of the room mirror 7 and obstructs the view, the display 1 according to the first embodiment does not come in the rear field of view 19, and accordingly exerts no influences upon the view.

Second Embodiment

The feature of the second embodiment consists in that a sliding direction of the rotating shaft 2 of the display 1 is inclined relative to the plumb. In FIG. 13-FIG. 17, structural members supporting the display 1 are designated by the same reference numerals as with the first embodiment, with them put a dash (') thereafter for discrimination. In the second embodiment, the rotating direction of a rotating shaft 2' is arranged to be inclined with respect to the perpendicularity. To be concrete, only the direction of a guide slot 13' is inclined, and the direction of the inclination is the same as that of the display 1 of the first embodiment in the opened state.

Figure 13:
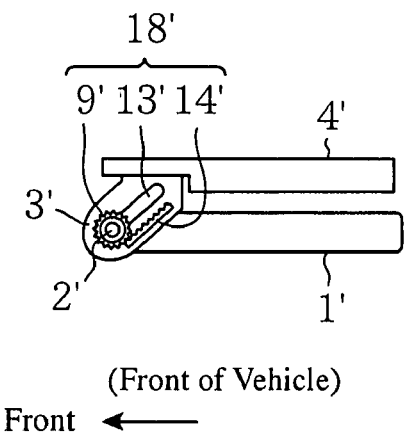
FIG. 13 is a front view showing the display in a closed state.
Figure 14:
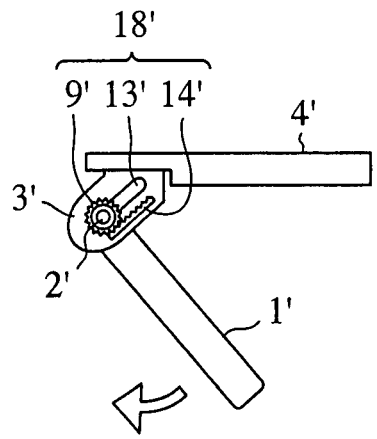
FIG. 14 is a front view showing a halfway state transitioning from a closed state to an opened state.
Figure 15:
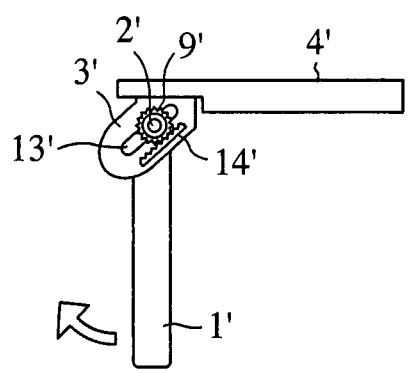
FIG. 15 is a front view showing a halfway state transitioning from a closed state to an opened state.
Figure 16:
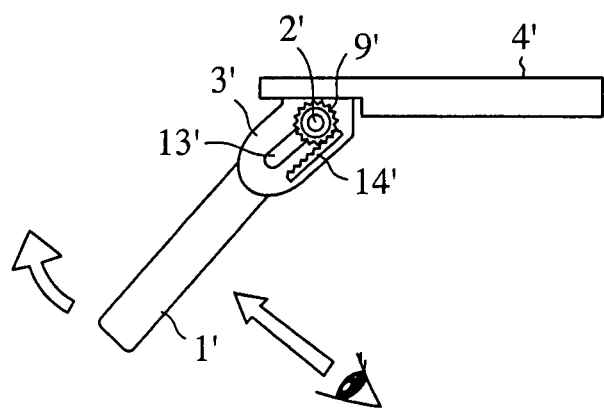
FIG. 16 is a front view showing the display in an opened state.

The operation of the display device will be mentioned. When a display 1' is in the closed state as shown in FIG. 13, rotating the display 1' in a clockwise direction induces rotation of the pinion 9' together with the rotating shaft 2' in the same direction, and at the same time, transmits a rotating force to a rack 14', thus shifting the rotating shaft 2' in an oblique upper right direction by reason that the shifting direction of the rotating shaft is restricted by the guide slot 13' (FIG. 14 and FIG. 15). Then, finally, as shown in FIG. 16 and FIG. 17, the display 1 moves to a position which got close to the plate 4 (FIG. 16).

Figure 17:
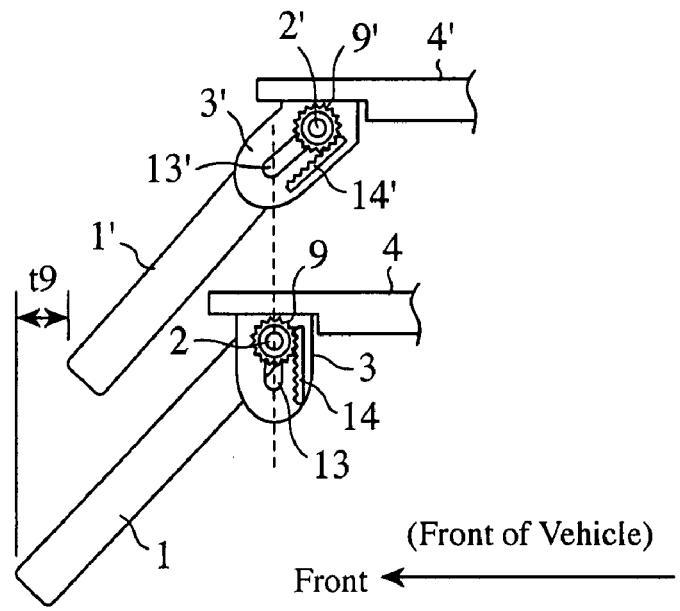
FIG. 17 is a view showing positions of the displays in an opened state as compared between the first embodiment and the second embodiment.

In FIG. 17, the display 1' more gets close to the plate 4' than the display 1 in the first embodiment by the distance t9 of a horizontal movement at a position at which it is fully opened (in the opened state), which can reduce the external dimensions of the display 1 in the opened state by the distance t9 of the horizontal movement.

As described above, hitherto, the rotating shaft of the display is a fixed fulcrum shaft, and therefore, the enlarged display gives rise to problem of obstructing the rear field of view of the room mirror, which has been a chief cause of impeding aggrandizement of the size of the display. In contrast, according to the second embodiment, the rotating shaft of the display is moved close to the ceiling of a vehicle, which realizes a large-sized display. Moreover, the rotating shaft of the display is moved diagonally upward such that the shaft gets close to the inside of the device body, which narrows a space created when the display is in the opened state, thereby further widening a residence space of an occupant. Besides, the display is positioned backward being apart from a driver's seat, thus further broadening the rear field of view of a driver.

Third Embodiment

Figure 18:
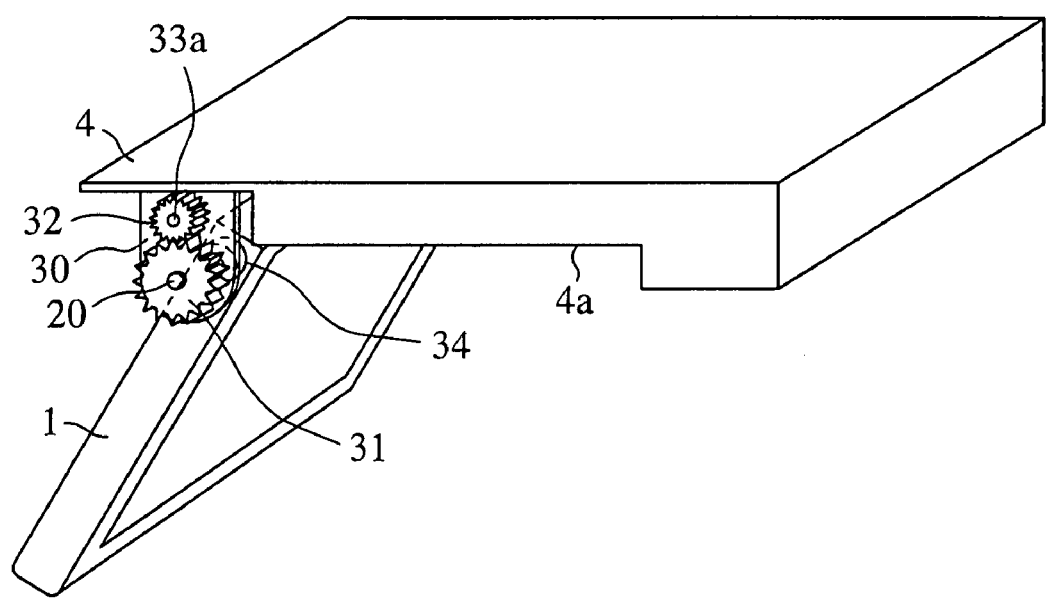
FIG. 18 is an oblique view of the display in an opened state.
Figure 19:
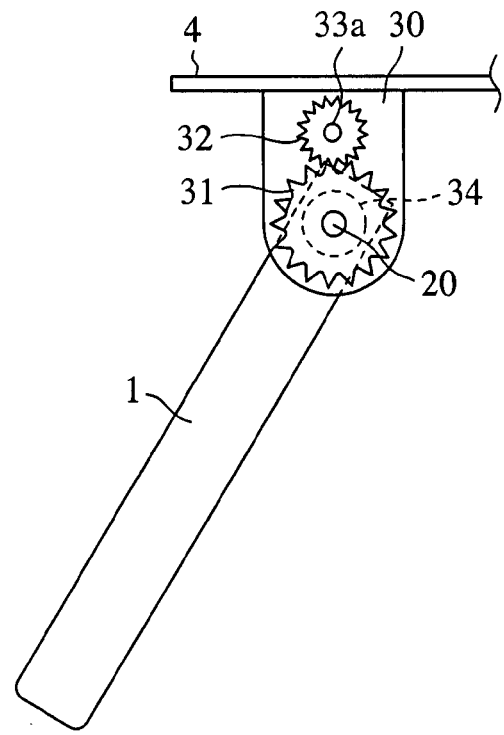
FIG. 19 is a front view explaining an electric opening and closing mechanism of the display.
Figure 20:
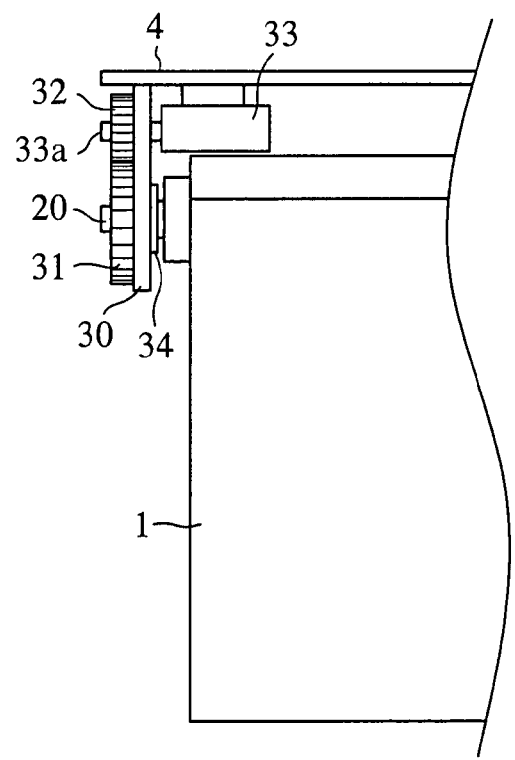
FIG. 20 is a side view explaining an electric opening and closing mechanism of the display.

In FIG. 18-FIG. 20, the display 1 is rotatable with a rotating shaft 20 integrally formed with the display 1 as a fulcrum. A bracket 30 serving as the support means of the rotating shaft 20 is droopingly fixed to the plate 4, and the bracket 30 is axially supported by the rotating shaft 20. The rotating shaft 20 concentrically projects from the right and left ends of the display 1, and the shown opposite side also has the same support structure as that at the shown side. The bracket 30 is secured to the plate 4 consisting the ceiling of the inside of a vehicle.

The rotating shaft 20 is fixedly provided with a follower gear 31, and the follower gear 31 gears with a driving gear 32. The driving gear 32 is fixed around the end of the shaft 33a of a motor 33. The shaft 33a pierces through the bracket 30, and the piercing portion of the shaft is axially supported by the bracket 30. The motor 33 is secured to the plate 4 and the motor has the shaft 33a and a motor-driven gear.

In such a construction, the follower gear 31 rotates accompanied with rotation of the driving gear 32 driven by the motor 33, and therefore, the display 1 rotates on the rotating shaft 20 as well. In short, the display 1 can electrically be opened and closed.

The setting of a speed reduction ratio between the driving gear 32 and the follower gear 31 to a large value accomplishes smooth opening and closing operations even for a large-scaled display. This eliminates the necessity for a lifting arm, which is a mechanism to transmit rotary motion of the motor 33 to the display through the gear, serving as a motion converting means, as in the Patent Document 2, and has no fear of obstructing the rear field of view of a driver etc. Opening and closing angles of the display 1 can be safely and easily selected at driver's discretion by determining a stop timing of the rotation by a switching operation of the motor 33.

While in the third embodiment, the driving gear 32 is directly attached to the shaft 33a of the motor 33, it is also feasible to change a driving force by a speed change gear to transmit the driving force depending on driving performances of the motor 33. However, as the motor 33 has a braking function to the rotating shaft in itself, it would not be able to prevent the occurrence of swings corresponding to backrush of a geared portion of the gear even if a rotating position of the display 1 could be held. Hence, it tends to be hard to see a display image of the display 1 due to microvibrations (swings) resulting from vibrations during driving. Further, periodical abnormal noises are apt to be made by the same reason.

Figure 21:
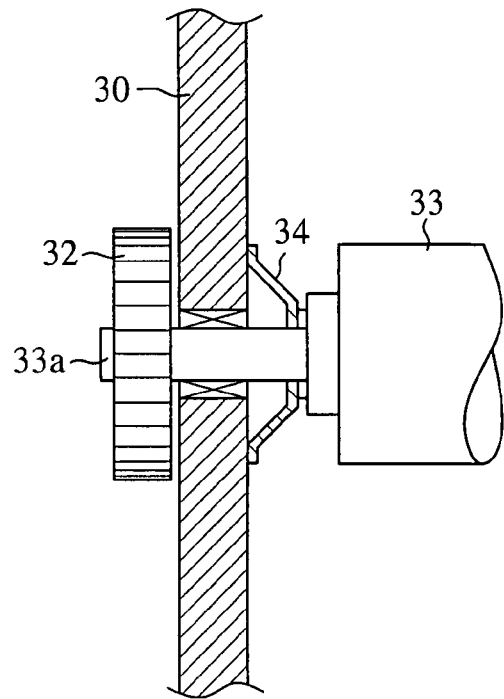
FIG. 21 is a sectional view of important parts explaining a braking means.

In order to avoid these situations, as the area concerned is shown enlarged in FIG. 21, the third embodiment is arranged to previously form a step in the shaft 33a, and to interpose a dished plate spring 34 between the step and the bracket 30 for applying a braking force to the shaft 33a. Here, the braking force of the plate spring 34 needs to be strong to the extent that it can stop at least the rotation of the display 1 caused by moment of the self-weight of the display.

Incidentally, the motor 33 shall have rotatable torque and be rotatable in spite of being applied such braking force on the motor. Thereby, such prevents the display 1 from being finely swung due to vibrations of the vehicle during driving, thus making a display image of the display 1 easy to see. Also, such is conducive to preventing the production of periodical abnormal noises. In housing of the display 1, the display 1 is rotated on the rotating shaft 20 in an anticlockwise direction from the opened state shown in FIG. 18 to the state in which the display 1 is substantially horizontal, and the display 1 is housed in a cut-out 4a of the plate 4.

Figure 22:
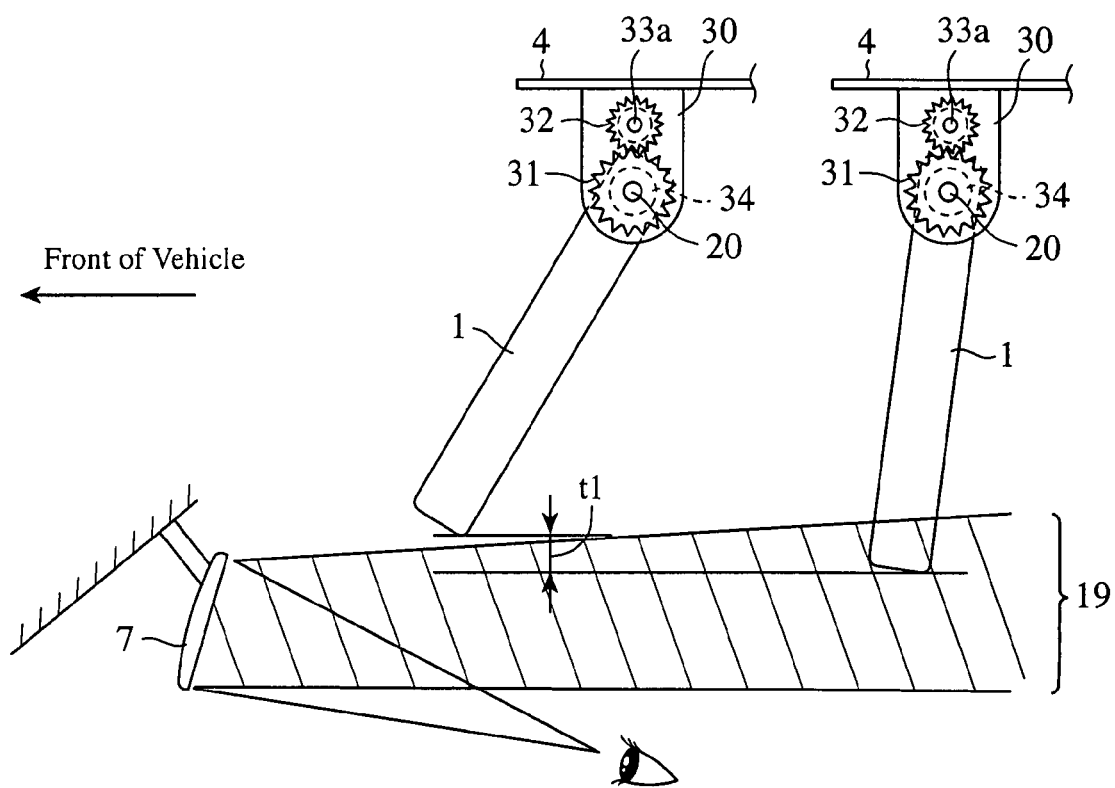
FIG. 22 is an explanatory view of an influence upon the rear field of view of a room mirror.

In the above-described arrangement, when the display 1 comes in the rear field of view 19 of the room mirror 7 at an opening angle shown in FIG. 22(a) and obstructs the rear field of view, the motor 33 is driven at an opening angle shown in FIG. 22(b) and retract the end of the display 1 to place it out of rear field of view 19 of the room mirror 7. This secures the rear field of view by displacing the display by a distance t1.

There is need of adjusting opening and closing angles of the display 1 for every person sitting on the seat because each person has different eye level. However, since in the arrangement including the plate spring 34, the display 1 has increased rotational resistance and the resistance compels a driver to use a considerably large operating force for manual operation of the display.

On this point, in the third embodiment, the display is driven by the motor, thus enabling an easy adjustment. In addition, the motor-driven display allows opening and closing of the display 1 and a driving adjustment thereof by a switch operation of a remote control unit, even by a child who does not reach the display 1. Besides, the electrically-driven display can impress a driver as high-grade.

Fourth Embodiment

Figure 23:
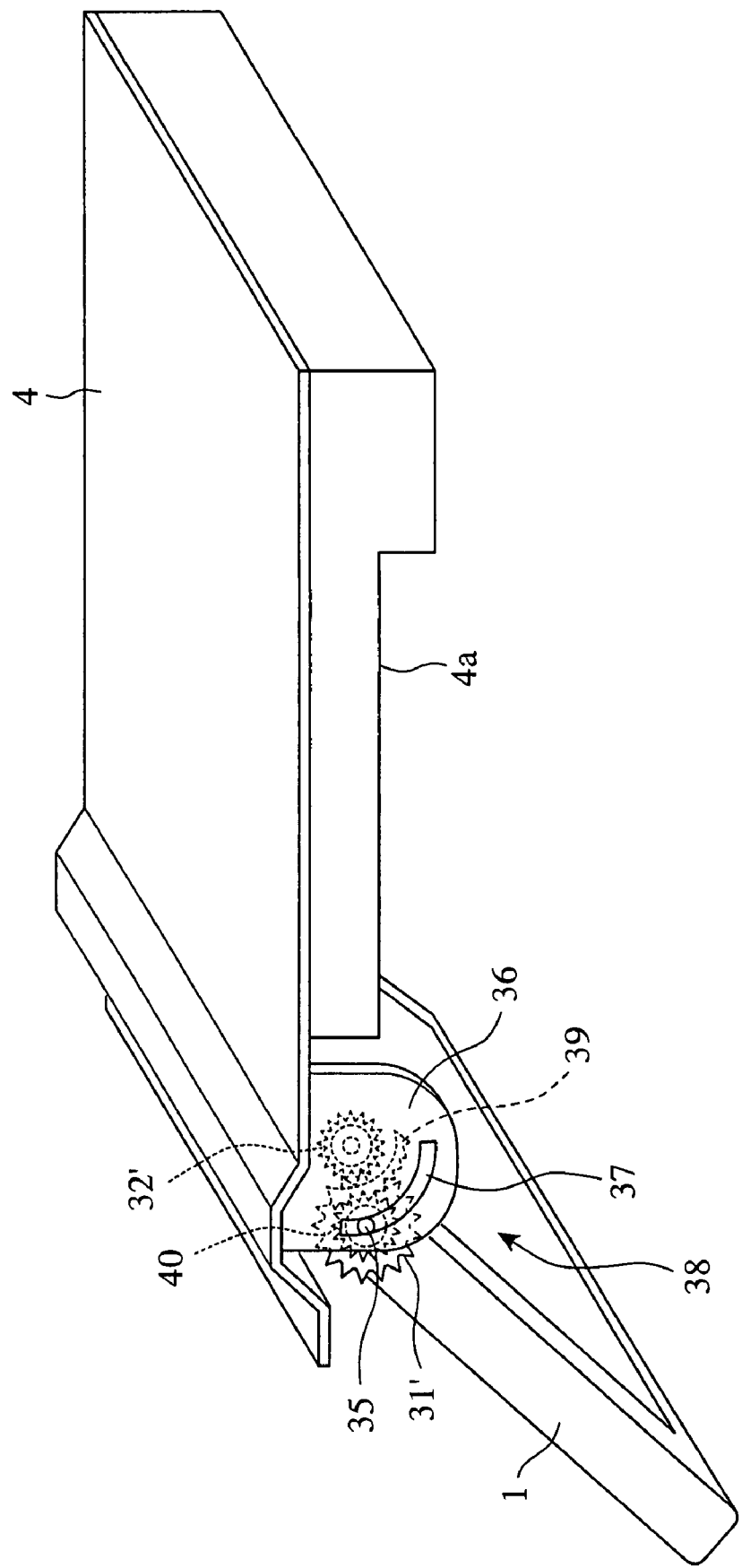
FIG. 23 is an oblique view of the display in an opened state.

FIG. 23 shows a state in which the display 1 is opened. The fourth embodiment shows a transition from the state in which the display 1 is housed in the cut-out 4a to the state in which the display is opened after being rotated on a rotating shaft 35. With the opening of the display 1, the rotating shaft 35 is moved (shifted) upward by being guided along a circular arc-like guide slit 37 formed in a bracket 36, which is droopingly fixed on the plate 4. On the one hand, with the closing of the display 1, the rotating shaft 35 is moved (shifted) downward by being guided by the guide slit 37.

Thus, as shown in FIG. 23, the feature of the fourth embodiment 4 consists in that the bracket 36, serving as the support means of the rotating shaft 35, is provided with a rotating shaft shifting means 38 for shifting the rotating shaft 35 by a predetermined distance in a predetermined direction when the display 1 is rotated to a predetermined angle on the rotating shaft 35 integrally formed with the display 1.

Figure 24:
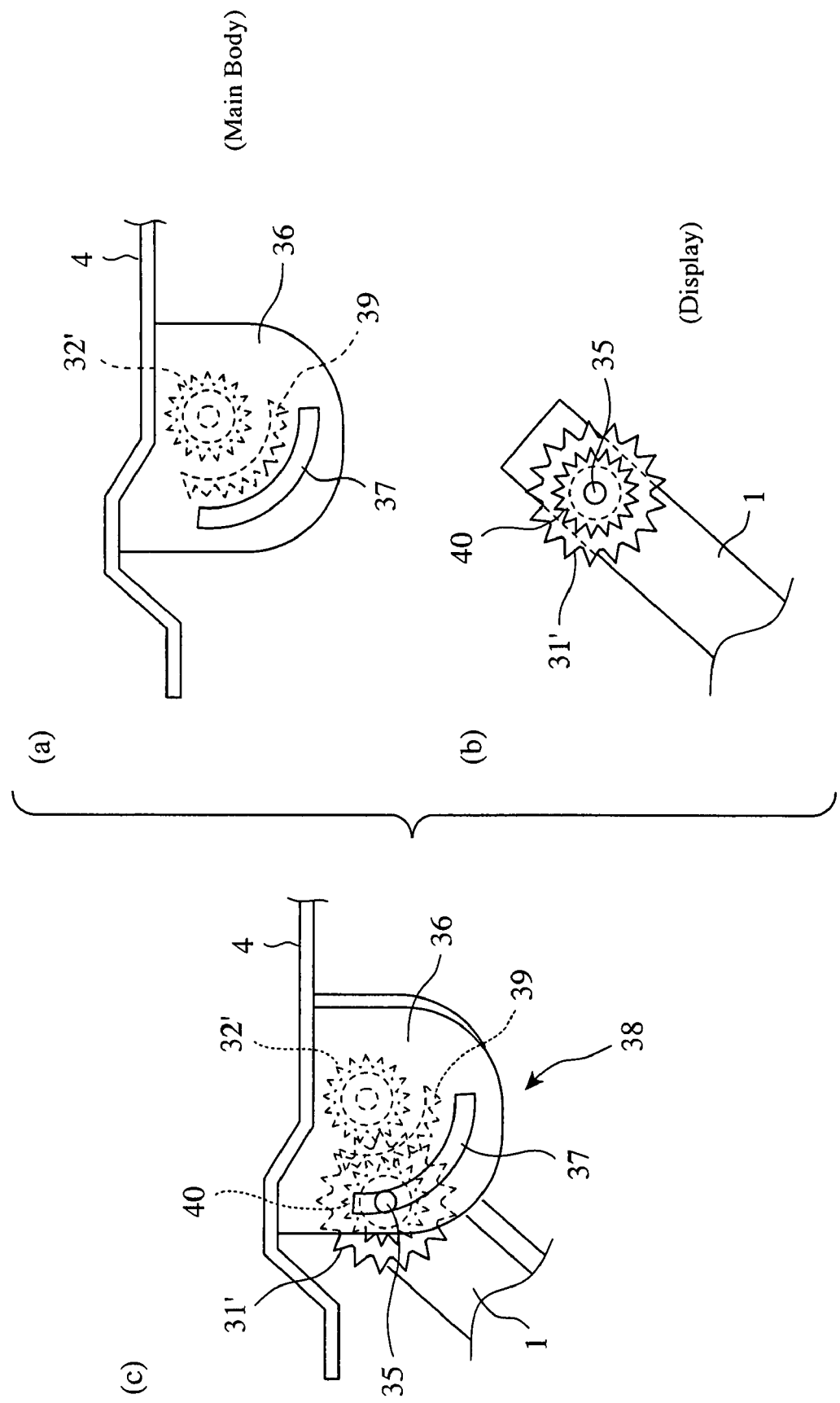
FIG. 24 is a front view explaining an electric opening and closing mechanism of the display.

FIG. 24 is a view showing the rotating shaft shifting means 38 divided into the main body (plate 4) shown in FIG. 24(a) and the display 1 shown in FIG. 24(b). Referring to FIG. 24(a), a driving gear 32' to be driven by a motor (not shown) is axially supported by the bracket 36.

The guide slit 37 is a circular arc-like slit concentrically formed with the shaft of the driving gear 32', and the slit is of size to the extent that the rotating shaft 35 can slidably fit therein. A circular arc-like rack gear 39, which is sized smaller than that of the guide slit 37, and is concentrically provided with the shaft of the driving gear 32', is fixed to the bracket 36. Referring to FIG. 24(b), the rotating shaft 35 is fixed on the display 1, and the rotating shaft 35 is coaxially integrally formed with a follower gear 31' and a pinion 40.

In the state in which the display 1 is assembled to the bracket 36, shown in FIG. 24(c), the rotating shaft 35 fits in the guide slit 37, the pinion 40 gears with the rack gear 39, and the follower gear 31' gears with the driving gear 32'.

Figure 26:
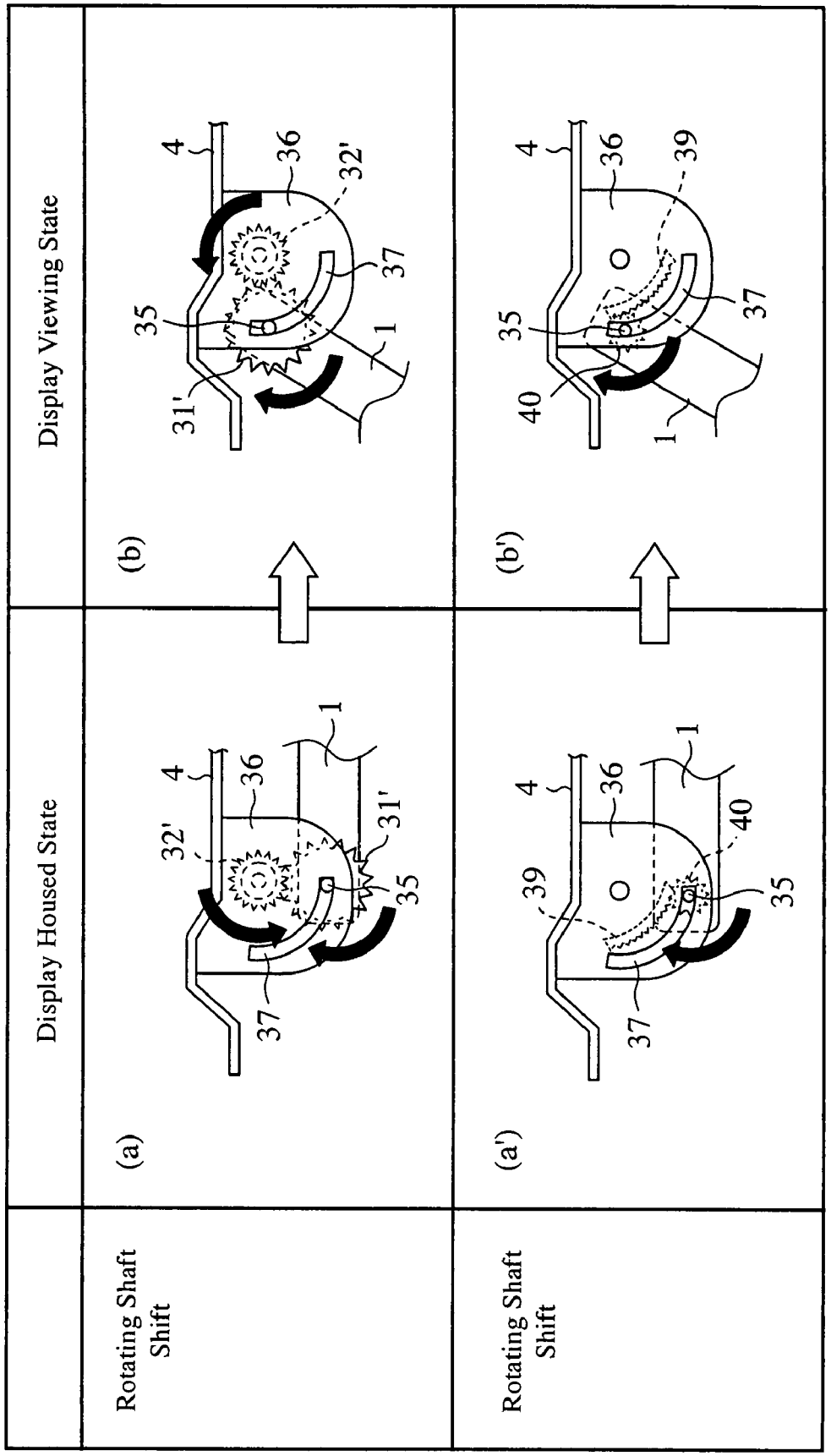
FIG. 26 is a view explaining in stages a shifting operation of the rotating shaft of the display.

In the following sections (1)-(4), an explanation will be given for states in which the display 1 is opened and closed, and rotation and a shift (a movement) of the rotating shaft 35 corresponding to the opened and closed states. FIG. 26(b) and FIG. 26(b') are views showing the bracket with the gear 32' and the gear 31' in FIG. 26(a) and FIG. 26(b) merely detached for explanatory purpose.

(1) Housed State

Figure 25:
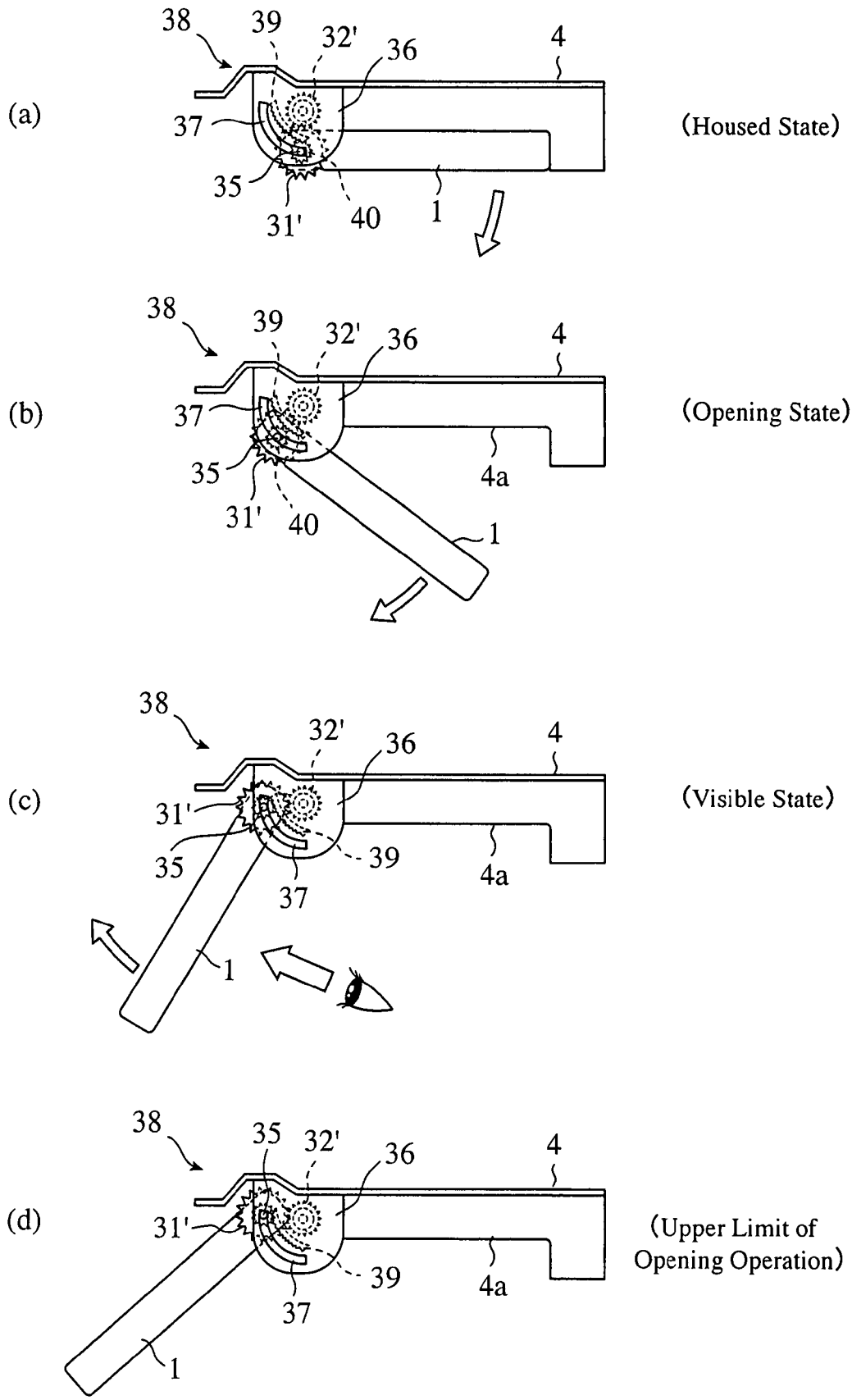
FIG. 25 is a view explaining in stages a shifting operation of the rotating shaft of the display.

As shown in FIG. 25(a), the display 1 is housed in the cut-out 4a. At that time, in FIG. 26(a), the rotating shaft 35 is stopped its rotation, and in FIG. 26(a'), the rotating shaft 35 is positioned in the lower end of the guide slit 37.

(2) Opening Operation

In FIG. 26(a), when the driving gear 32' is rotated in a direction shown by an arrow, by driving the motor (not shown), the follower gear 31' geared with the driving gear 32' is rotated, and the rotating shaft 35 integrally formed with the follower gear 31' is rotated simultaneously therewith, with the result that the display 1 transitions from the housed state (closed state) shown in FIG. 25(a), FIG. 26(a), and FIG. 26(a') to the opening operation. The state of the display 1 in the opening operation is shown in FIG. 25(b). Moreover, the pinion 40 integrally formed with the rotating shaft 35 is rotated by rotation of the rotating shaft 35, and the pinion 40 shifts (moves) upward with the rotating shaft 35, while rotating, on the rack gear 39 along circular arcs of the guide slit 37 and the rack gear 39.

(3) Visible State

The rotating shaft 35 moves upward on a path along the circular arc by being guided by the guide slit 37 with its rotation thereof. Further, the display 1 is also rotated with the rotation of the rotating shaft 35, goes through the rotating operation (FIG. 25(b)), and finally leads to a visible state in which the display is in a state suitable for viewing, shown in FIG. 25(c), FIG. 26(a), and FIG. 26(a'). Until the display comes to the visible state, the rotation of the driving gear 32' is transmitted to the follower gear 31' and the display 1 gradually opens. Further, as shown in FIG. 26(b'), as the follower gear 31' rotates, the pinion 40 is rotated and the rotating shaft 35 moves upward along the guide slit 37.

(4) Upper Limit of Opening Operation

An angle of the display 1 in the visible state varies depending on a position of a user of the display 1 with respect to the display 1 and eye level of the user. The angle of the display 1 can be adjusted until the rotating shaft 35 abuts against the upper end of the guide slit 37 (FIG. 25(d)), and a position at which the rotating shaft 35 abuts against the upper end of the guide slit 37 is a position of the upper limit of the opening operation of the display 1.

As the motor (not shown) reversely rotates, the driving gear 32' also rotates in a reverse direction and the display 1 returns to the housed state, as shown in FIG. 25(a), FIG. 26(a), and FIG. 26(a'). As mentioned hereinabove, the feature of the fourth embodiment consists in that the rotating shaft 35 moves upward with the opening of the display 1, and moves downward with the closing of the display 1.

Figure 27:
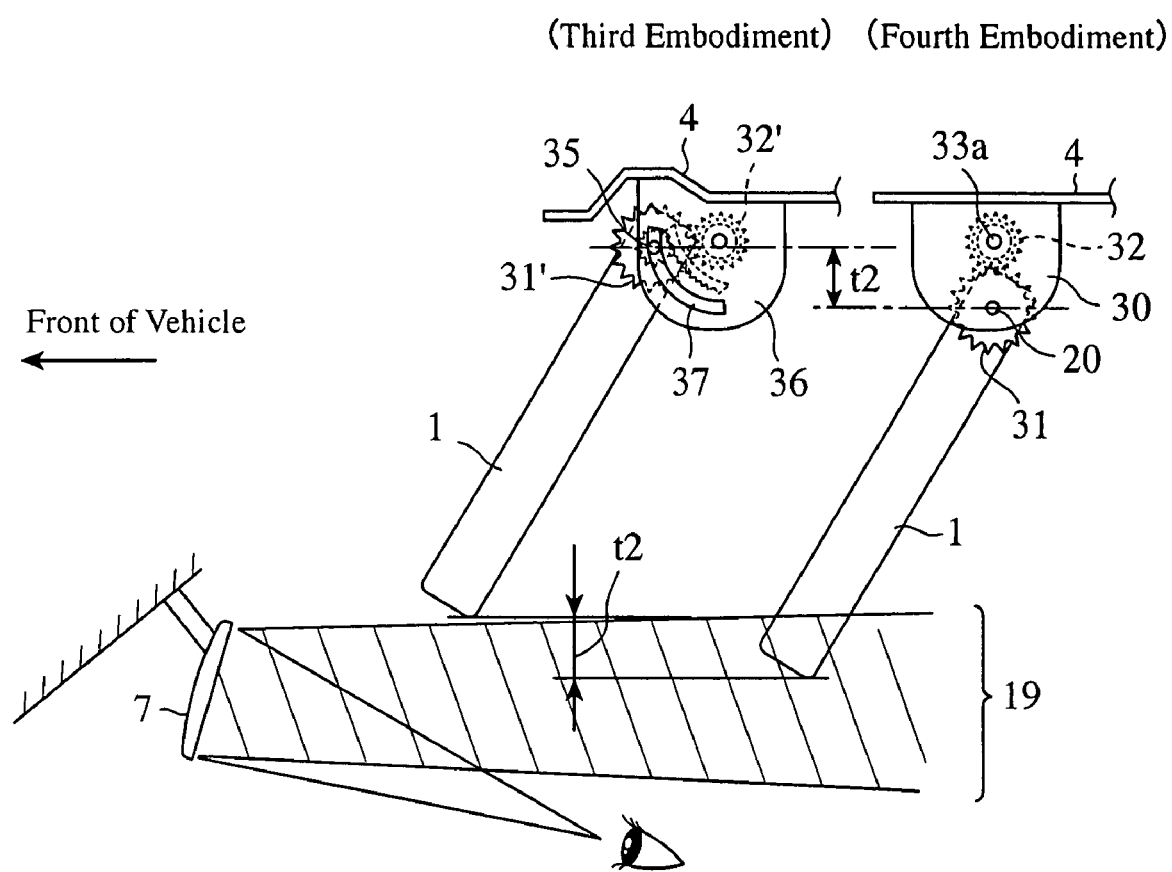
FIG. 27 is an explanatory view of an influence upon the rear field of view of the room mirror.

Referring to FIG. 27 in which influences upon the rear field of view of the room mirror 7 are compared between the third embodiment and the fourth embodiment, there is a difference therebetween. That is, a position of the rotating shaft 20 in the third embodiment does not shift on the bracket 30 with the opening of the display 1, whereas in the fourth embodiment, the rotating shaft 35 shifts upward on the bracket 36.

As a result, when the display 1 is opened up to the same tilt angle relative to the perpendicularity in the third embodiment and the fourth embodiment, in the fourth embodiment, the position of the rear end of the display 1 is retracted out of the rear field of view 19 of the room mirror 7, while in the third embodiment, the rear end thereof is within the rear field of view 19. In concrete terms, there is a difference "t2"="the distance in a vertical direction between the rotating shaft 35" and the rotating shaft 25="the distance in a vertical direction between the two rear ends of the displays 1".

Therefore, it can be said that when the display device is placed at the same visual angle, the fourth embodiment provides the obstruction-free rear field of view of the room mirror 7. Remark parenthetically, in the fourth embodiment, the provision of the braking means (not shown) using the plate spring corresponding to that of the third embodiment may drive the similar benefit such as prevention of vibrations of the display 1 and vibrational sounds.

INDUSTRIAL APPLICABILITY

As described above, the present invention is suitable to provide a display device which is provided on the ceiling of a vehicle or the equivalent, and is free from obstruction of the rear field of view of a driver.

The invention claimed is:

1. A display device including a display means, which is rotatable in opening and closing directions; a rotating shaft of the display means; and a rotating shaft supporting means, the display device comprising:
    a rotating shaft shifting means for shifting the rotating shaft by a predetermined distance with respect to the rotating shaft supporting means in a predetermined direction when the display means is rotated to a predetermined angle on the rotating shaft.

2. The display device according to claim 1, wherein the rotating shaft shifting means shifts the rotating shaft through a combined mechanism of a rack and a pinion provided in a joint of the rotating shaft and the rotating shaft supporting means.

3. The display device according to claim 1, wherein the rotating shaft shifting means, when the display means is rotated from a closed state to an opened state, shifts the rotating shaft such that a display screen of the display means moves by a predetermined distance in an upward direction viewing from a viewer.

4. The display device according to claim 2, wherein the pinion is integrally formed with the rotating shaft and the rotating shaft is rotatably and movably engaged in a guide slot restricting a shifting direction of the rotating shaft.

5. The display device according to claim 3, wherein the pinion is integrally formed with the rotating shaft and the rotating shaft is rotatably and movably engaged in a guide slot restricting a shifting direction of the rotating shaft.

6. The display device according to claim 1, wherein the shifting direction of the rotating shaft is inclined relative to the perpendicularity.

7. A display device including a display means, which is rotatable in opening and closing directions; a rotating shaft of the display means; and a rotating shaft supporting means, the display device comprising:
a follower gear integrally formed with the rotating shaft, and a motor-driven driving gear geared with the follower gear.

8. The display device according to claim 7, wherein a braking means, which can stop at least rotation of the display means by moment of self-weight of the display means.

9. The display device according to claim 7, wherein a rotating shaft shifting means for shifting the rotating shaft by a predetermined distance in a predetermined direction when the display means is rotated to a predetermined angle on the rotating shaft.

10. The display device according to claim 9, wherein the rotating shaft shifting means includes a pinion, which is coaxially and integrally provided with the follower gear; and a circular arc-like rack gear, which is coaxially formed with the driving gear, and gears with the pinion, the rotating shaft shifting means shifting the rotating shaft along a guide through a combined mechanism of the pinion and rack gear.

* * * * *